Aug. 7, 1934.　　　B. V. NAGASHEV　　　1,969,520

ELECTRIC MOTOR

Filed March 25, 1932

Inventor:
Boris V. Nagashev,
by *Charles E. Tullar*
His Attorney.

Patented Aug. 7, 1934

1,969,520

UNITED STATES PATENT OFFICE

1,969,520

ELECTRIC MOTOR

Boris V. Nagashev, Cambridge, Mass., assignor to General Electric Company, a corporation of New York Application March 25, 1932, Serial No. 601,177

14 Claims. (Cl. 219—8)

This invention relates to an alternating current adjustable speed reversible motor and is particularly adaptable to all cases where speed variation and reversal of rotation are required as a result of the change in the alternating voltage or current.

The main object of my invention is to have such a motor in which the variation in speed and the reversal in direction of rotation will take place without any moving contacts.

Another object of my invention is to have such a motor of very simple and compact design and so that it can be used in practical applications with great economy and unusual ease.

Figure 1:
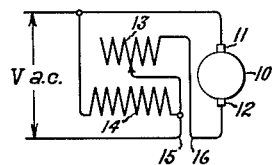
Figure 2:
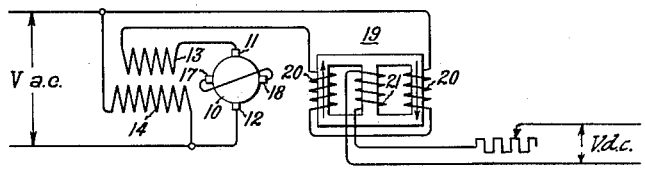
Figure 3:
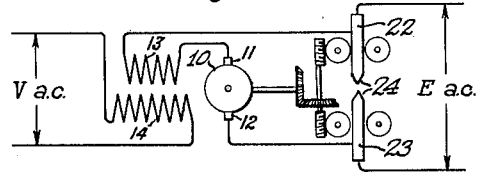
Figure 4:
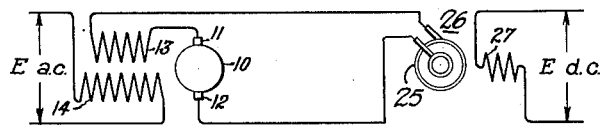

The novel features which I believe to be characteristic of my invention are set forth with particularity in the appended claims. My invention itself, however, will best be understood by reference to the following specification when considered in connection with the accompanying drawing in which Fig. 1 is a schematic representation; Fig. 2, a modified form of the invention in which the speed regulation and reversing take place by means of direct current; Fig. 3 shows the motor of Fig. 1 applied to an arc welding circuit; and Figure 4 shows a method of controlling such motor by means of a synchronous motor.

Throughout the explanation of the description and operation of this motor it should be borne in mind that this motor is essentially of the constant flux type. This statement has been made because from the diagram it may seem that it resembles a compound wound motor. In a compound motor, however, the principle of operation is based upon algebraic addition or subtraction of the fluxes produced by the field coils so that the compound motor is essentially a variable flux motor and furthermore in the compound wound motor the shunt winding is not called upon to carry any power current whereas the motor of my invention is based upon a transformer action between the two windings and any power current carried by one must necessarily have an equivalent component in the other. Referring to the drawing, Fig. 1 shows an armature 10 provided with brushes 11 and 12 connected by means of taps through the series field 13 to an alternating voltage, V A. C. The shunt field 14 is connected in parallel with the armature 10 and the series field 13 across the source of supply V A. C. The shunt field 14 and series field 13 are connected in inductive relationship so that a transformer action takes place between these two windings.

The operation of this motor can be best described by first assuming that the series winding 13 is eliminated and that the line at point 15 is directly connected to the line at point 16, bearing in mind that the flux in the shunt field 14 remains substantially constant. If the current at a particular instant is downward in the armature, the motor will rotate in one direction. If at this same instant the current in the armature 10 could be reversed, the motor would rotate in the opposite direction. If a voltage can be introduced at points 15 and 16 of a magnitude to cause the current to flow in an upward direction in the armature, the motor would reverse, since the flux remains constant. This could be done in any number of ways, for example, by means of a secondary transformer winding connected across these points with a primary winding supplied by an independent alternating voltage. Instead of doing this, however, the series field can be introduced at this point, this series field being designated by 13, and this series field instead of being supplied from a separate alternating current source will have a voltage induced in it by the action of the shunt field 14. It can be readily seen from this by increasing or decreasing the number of turns in the secondary winding, i. e., the series winding 13, the voltage induced in this winding will be of a greater or smaller magnitude. By making many turns, the voltage induced will be sufficiently large and will send this current upward and reverse the direction of the rotor 10. If the turns are appreciably small in number, the rotor will rotate in the opposite direction. This same result can be accomplished by various other means such as, for example, inserting a resistance in series with the series field 13. From this relationship it can be seen that at one point the rotor will cease to operate entirely.

It may be desirable in some cases to control the speed and direction of rotation of the motor by direct current. A method of doing this is shown in Fig. 2. This motor consists of a rotor 10 provided with four brushes 11, 12, 17 and 18, two of which, 17 and 18, are short-circuited. This armature is connected in series with the series field 13 and coils 20 of reactor 19. The reactor 19 has in addition to the winding 20 a direct current winding 21 supplied by a direct current voltage, V D. C. The special design of the reactor illustrated is utilized so that there will be no reaction between the alternating current winding 20 and the direct current winding 21 of the reactor. The alternating current winding is divided into two parts 20 which are wound on the outside legs of the iron circuit and in such a direction that at a given instant the alternating fluxes due to the two parts are in the direction shown by the arrows. It will be noted that this causes the magnetic flux due to the alternating current in the middle core to be zero. The direct current winding is located on this middle leg which carries only continuous flux. When the direct current is high, the saturation of the iron core is high as a consequence of which the inductance is low and a comparatively high voltage will be impressed across the armature circuit. When the direct current voltage is low, the impedance or inductance of the reactor 19 is very high, the armature circuit voltage is low, which, of course, will reduce the speed of the rotor 10 but of course the direction of rotation cannot be changed in this way. By placing additional brushes 17, 18, on the armature in the position shown and short-circuiting them, a low impedance path is provided and the motor can be reversed in rotation. This can be explained as follows: There is an E. M. F. induced in the armature winding because of transformer action between it and the field winding supplied with alternating current. This E. M. F. causes a current to flow through the short-circuited brushes and will produce a torque, the direction of which depends upon the position of the brushes. A second torque is produced by the current flowing through the main brushes. At certain current values these two torques will be equal and opposite. If one of these current values is increased or decreased, the torque due to this current will either be greater or smaller than the torque due to the other current. The regulation of the current through the main brushes is controlled by the reactor 19, and therefore the speed and direction of rotation of the rotor 10 can be controlled by varying the value of V D. C.

Experiment has shown that this set of brushes can be added in the modification to the motor shown in Fig. 1 and will improve the torque characteristic of this motor. In Fig. 3 I have shown the motor of Fig. 1 applied to an arc welding system in which the arc is adjusted automatically without any switching or circuit interrupting. The field 14 is connected to the alternating current voltage source V A. C. The series field 13 and armature 10 are connected in parallel with the arc 24. The circuit through the series field 13, armature 10 and to the arc 24 is connected to the supply E A. C. which is the arc power supply circuit. Assume first that the electrodes 22 and 23 are separated by a short distance and that the arc power supply circuit is closed. The voltage across the arc 24 being comparatively large, the voltage of the series field taken from the arc is larger than the voltage induced in the series field by the winding 14 which will cause the motor to rotate in one direction, this direction being such as to make the electrodes 22 and 23 approach each other. At the moment of contact, the voltage across the motor armature circuit is approximately zero and the voltage induced in the series field 13 by the field 14 prevails. This causes the motor to reverse its direction of rotation and pull the electrodes apart, thus striking the arc. The relationship between the field coils 13 and 14 is so adjusted that when the distance between the electrodes reaches a predetermined value, which of course would be such that the arc will burn steadily, the motor stops entirely. This voltage at which the motor is at rest can be readily adjusted by merely changing the ratio of transformation.

The speed and direction of rotation of the motor of my invention can be controlled by the relative phase displacement between the motor flux and armature current. The phase angle between this flux and current can be altered by changing the impedance in the armature circuit. This principle of operation is utilized in controlling the speed and direction of rotation of my motor, as shown in Fig. 4. In Fig. 4 the series field 13 and armature 10 are placed in circuit with the armautre 25 of the synchronous motor 26, the field 27 of which is supplied by direct current voltage E D. C. If the synchronous motor 26 is over-excited, it will draw leading current and will cause the motor armature 10 to rotate in one direction. If this synchronous motor is under-excited the motor will draw lagging current and cause the armautre 10 to rotate in the opposite direction. This can be explained as follows: If the phase angle between armature current and motor flux is 90°, then the rotor will be stationary. If this phase angle is made more or less than 90°, then the direction of rotation of the rotor will be in one direction or another respectively. This change in the phase angle between the rotor current and motor flux can be effected in various ways, for example, by inserting inductive or capacitative reactance in the armature circuit. This method can be applied to controlling the motor shown in Fig. 2 in which case no auxiliary short-circuit brushes need be used.

While I have described the embodiments of my invention and certain apparatus for carrying out my method, it will be obvious to those skilled in the art that various modifications can be made without departing from the true spirit and scope of my invention. I therefore desire to cover all such modifications as fall within such scope in the appended claims.

What I claim as new and desire to secure by Letters Patent of the United States:

1. An alternating current motor comprising an armature, a field winding in series with said armature, a second field winding, means for producing a current with a given direction in said armature, and means including said two field windings for introducing in said armature a current opposite in direction to the first mentioned armature current.

2. The combination of a substantially constant source of alternating current with a motor comprising a shunt field winding energized by said source, a second source of alternating current, the phase of which is variable with respect to said first source, an armature for said motor, and a series field winding in transformer relation to said shunt field winding, said second source being connected across said armature and series field winding.

3. In combination with a substantially constant source of alternating current, an alternating current motor comprising a field winding energized by said source, an armature, a second field winding in series with said armature and in transformer relation to said shunt field winding, by which relationship a voltage is induced in said series field winding, a second source of alternating current and means connected across said second source for automatically varying the voltage of said second source by which means the relationship between the voltage impressed on said series field winding from the second source and the voltage induced therein from the first source is a variable.

4. In combination with a substantially constant source of alternating current and a variable source of alternating current, means for establishing an arc including two electrodes connected across said variable source, and a motor mechanically coupled to said electrodes for changing the distance therebetween, said motor comprising an armature, a field winding in series with said armature, said combination of series field winding and armature being connected in parallel with said electrodes and a shunt field winding energized by said constant source in transformer relation to said series field winding.

5. In combination with a substantially constant source of alternating current and a variable source of direct current, an electric motor comprising a shunt field winding energized from said alternating current source, an armature, a field winding in series with said armature and in transformer relation with said shunt field winding, and a reactance in said armature circuit which varies in accordance with the current conditions of said direct current source.

6. In combination with a substantially constant source of alternating current and a source of direct current, a motor comprising a shunt field winding energized by said alternating current, an armature, a field winding in series with said armature and in transformer relationship with said shunt field winding, and a reactance in series with said series field and armature, said reactance comprising a magnetic core formed of three legs, on the outside legs of which are windings in series with said armature and series field winding so that their fluxes will oppose each other on the middle leg, and a coil energized from said direct current source on the middle leg.

7. In combination with a source of alternating current and a source of direct current, a synchronous motor comprising a direct current field winding energized from said source of direct current and an armature, and a second motor comprising an armature in series with said synchronous motor armature, a series field winding for said second motor in series with said armatures and a shunt field winding for said second motor in transformer relation to said series field winding and energized by said source of alternating current.

8. An alternating current motor comprising a shunt field winding, a series field winding in transformer relation to said shunt field winding, an armature connected in parallel with said shunt field winding and in series with said series field winding and a variable reactance in series with said series field winding and armature.

9. In combination with a substantially constant source of alternating current, a variable source of direct current, an electric motor comprising a shunt field winding energized from said alternating current source, an armature including two short circuited auxiliary brushes at approximately 45° to the flux of the field winding, a field winding in series with said armature and in transformer relation to said shunt field winding, and a reactance in said armature circuit which varies in accordance with the current conditions of said direct current.

10. In combination with a substantially constant source of alternating current, a variable source of alternating current, a motor comprising a shunt field winding energized from said first source and an armature connected across said second source, two electrodes mechanically coupled with said armature and connected across said second source, and means for varying the phase angle between the armature current and the motor flux.

11. The combination of a substantially constant source of alternating current with an alternating current motor comprising a field winding connected across said source, a second source of alternating current variable in magnitude and variable in phase relative to said first source, an armature for said motor, and a series field winding for said motor in transformer relationship to said first field and connected to said second source of alternating current.

12. In combination with a source of alternating current an alternating current electric motor comprising an armature, a field winding in series with said armature, said armature and series field winding being connected across said source, and a shunt field winding connected across said source and in transformer relationship to said series field winding.

13. In combination with a source of alternating current, an alternating current motor comprising an armature, a winding in series with said armature, said combination of armature and series winding being connected across said source, a winding connected in parallel with said combination of series winding and armature, said parallel winding being connected across said source, and in transformer relation with said series winding.

14. The method of controlling the speed and direction of rotation of an alternating current commutator motor having series and shunt field windings which consists in supplying said motor from an alternating current source and thereby impressing a given voltage on the armature, impressing an opposing voltage on the armature by transformer action between said shunt and series field windings and varying the relative magnitudes of the two voltages thus impressed upon the armature.

BORIS V. NAGASHEV.